(12) United States Patent
Boyd

(10) Patent No.: US 9,109,746 B1
(45) Date of Patent: Aug. 18, 2015

(54) MOUNTING APPARATUS FOR A PORTABLE ELECTRONIC DEVICE

(76) Inventor: Sandy H. Boyd, Midland, TX (US)

( * ) Notice: Subject to any disclaimer, the term of this patent is extended or adjusted under 35 U.S.C. 154(b) by 205 days.

(21) Appl. No.: 13/556,671

(22) Filed: Jul. 24, 2012

(51) Int. Cl.
*F16M 11/00* (2006.01)
*F16M 11/04* (2006.01)

(52) U.S. Cl.
CPC .............. *F16M 11/04* (2013.01); *F16M 11/00* (2013.01); *F16M 11/041* (2013.01)

(58) Field of Classification Search
CPC ...... F16M 11/041; F16M 11/40; F16M 13/00
USPC ............. 361/679.55, 679.56, 679.57, 679.58; 248/274.1, 160, 447.1, 479, 177.1, 248/178.1
See application file for complete search history.

(56) References Cited

U.S. PATENT DOCUMENTS

| | | | | |
|---|---|---|---|---|
| 3,727,397 | A * | 4/1973 | Ethier | 368/316 |
| 3,962,678 | A * | 6/1976 | Kurokawa | 362/275 |
| 5,187,744 | A * | 2/1993 | Richter | 379/449 |
| 5,889,624 | A * | 3/1999 | Dickenson | 359/841 |
| 6,032,910 | A * | 3/2000 | Richter | 248/274.1 |
| 6,726,070 | B2 | 4/2004 | Lautner | |
| 6,795,309 | B2 * | 9/2004 | Hartung et al. | 361/679.4 |
| 8,684,325 | B1 * | 4/2014 | Beshara | 248/281.11 |
| 2008/0019082 | A1 * | 1/2008 | Krieger et al. | 361/679 |
| 2008/0166930 | A1 * | 7/2008 | Nelson | 439/813 |
| 2010/0195278 | A1 * | 8/2010 | Wilkenfeld | 361/679.33 |
| 2010/0264182 | A1 | 10/2010 | Perlman et al. | |
| 2011/0164173 | A1 | 7/2011 | Orf | |
| 2011/0240830 | A1 | 10/2011 | Alemozafar et al. | |
| 2011/0248060 | A1 | 10/2011 | Luk et al. | |
| 2011/0292666 | A1 * | 12/2011 | Gallagher | 362/457 |
| 2012/0043247 | A1 * | 2/2012 | Westrup | 206/472 |
| 2013/0009032 | A1 * | 1/2013 | Polletta et al. | 248/440.1 |
| 2013/0134268 | A1 * | 5/2013 | Wessells et al. | 248/125.8 |

OTHER PUBLICATIONS

Xtand for iPhone 4/3GS/3 and iPod Touch 4G. http://www.annazon.com/Xtand-iPhone-3GS-iPod-touch/dp/B004CQMYBQ.
Universal Windshield/Vent Car Mount Holder for Smartphones, PDAs, Apple iPhone 4 3G Samsung BlackBerry HTC LG Motorola Nokia Palm Sony Ericcson Sanyo Pantech (Black) http://www.amazon.com/gp/product/B004COJN4O/ref=pd_lpo_k2_dp_sr_2/188-0438202-7074500?pf_rd_m=ATVPDKIKX0DER&pf_rd_s= lpo-top-stripe-1&pf_rd_r=05X47BK8KK0CR7ZQ4479&pf_rd_t=201&pf_rd_p=486539851&pf_rd_i=B004CQMYBQ.

* cited by examiner

*Primary Examiner* — Jayprakash N Gandhi
*Assistant Examiner* — Mandeep Buttar
(74) *Attorney, Agent, or Firm* — Robert C. Montgomery; Montgomery Patent & Design

(57) ABSTRACT

A mounting apparatus for portable electronic devices provides a hands-free support for utilizing various portable electronics, such as smart phones or tablets. The mounting apparatus includes a specialized base for use with a floor, table, wall, or headboard surface. An upper assembly secures to the electronic device and can be tilted to a desired orientation. The upper assembly also includes an illuminating accessory for ease of viewing in dim lit situations and an attachable privacy curtain.

15 Claims, 9 Drawing Sheets

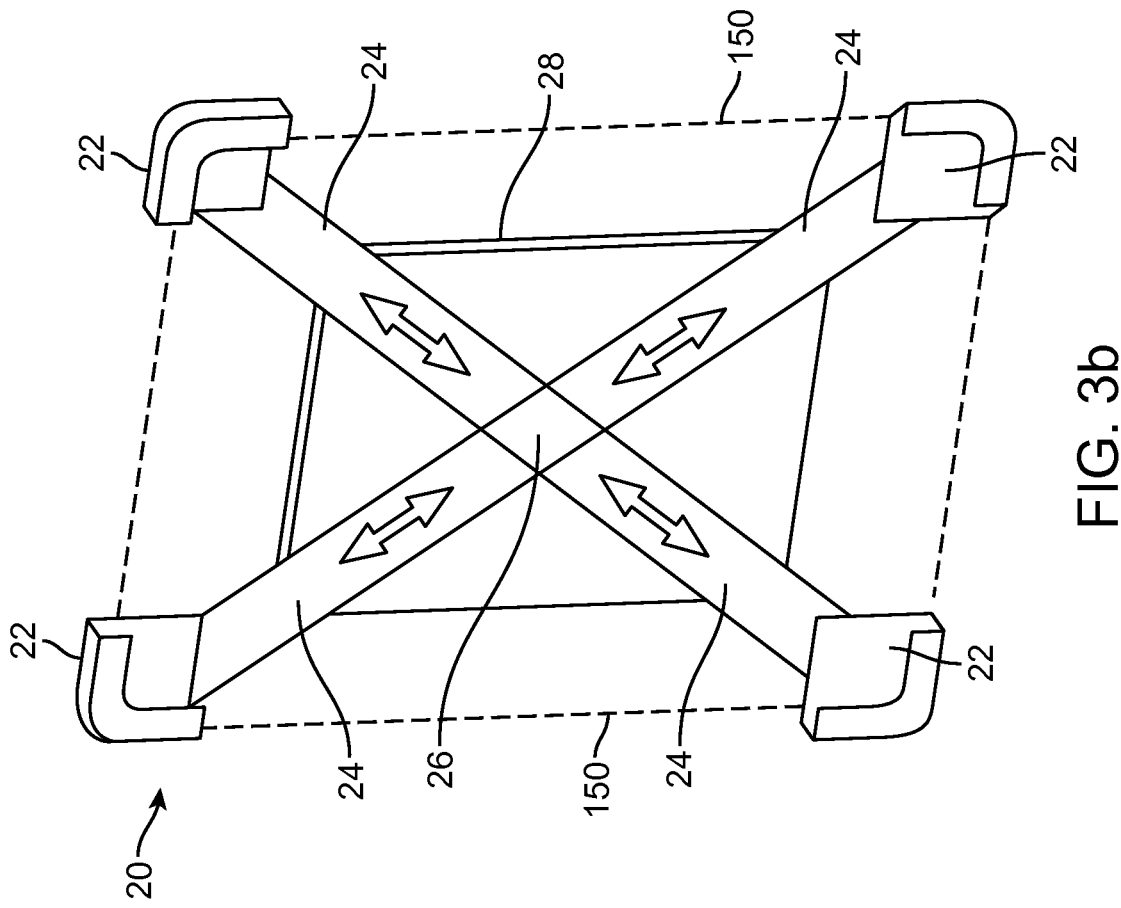
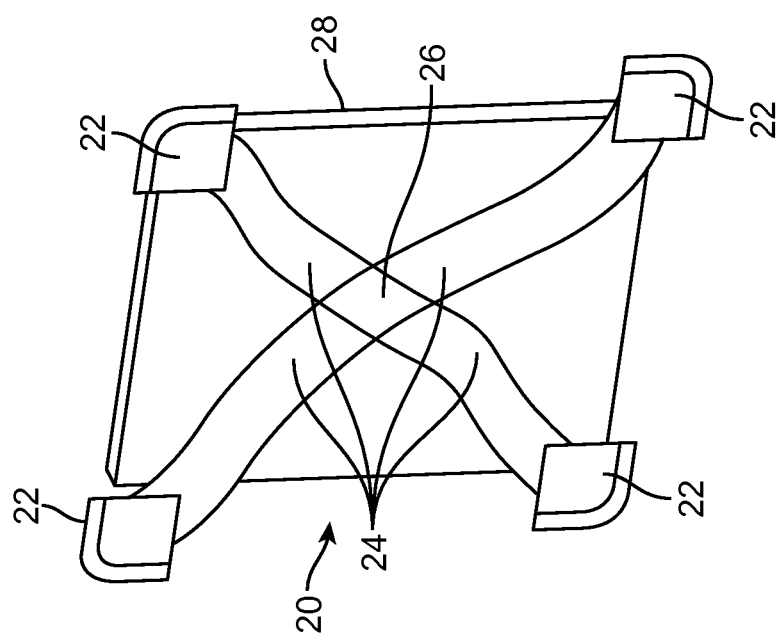
FIG. 3b
FIG. 3a

MOUNTING APPARATUS FOR A PORTABLE ELECTRONIC DEVICE

RELATED APPLICATIONS

Not Applicable.

FIELD OF THE INVENTION

The present invention relates generally to holders for portable electronic devices, and in particular, to a free standing apparatus for temporarily mounting various sizes and styles of portable electronic devices.

BACKGROUND OF THE INVENTION

Cradles and stands for use with portable electronic devices are known. Typically these cradles or stands are designed to temporarily support the portable electronic device while recharging the internal battery or transmitting data to and from the device. Many of the more popular portable electronic devices, such as smart phones and tablet computers, now have larger viewing screens intended to display photos, videos, web pages, books, or other visual data. This has effectively made the modern portable electronic device a personal entertainment device that many people use to read books and watch movies. One (1) problem that is associated with the increased use and viewing of such devices is the need to hold the device in a suitable viewing position for extended periods of time.

In response to this increased functionality, stands and holder have been introduced that also position the device in a generally vertical position for viewing. Unfortunately, the holding and support devices available are designed to only support a particular size or style of electronic device and lack suitable customization. Additionally, the stands often lack the electrical connection that cradles provide. Furthermore, by design the stands limit use and viewability due to the requirement that the stand rest upon a flat horizontal surface. This requires the use to still have to physically hold the portable electronic device when viewing in a lounge chair, bed, or other relaxed position. As these portable electronic devices have become more popular, they have overtaken the television or book as a pre-sleep ritual for many people. Unfortunately, the light and sound of this bedtime use often disturbs a bedmate. Further still, many stands are unstable and prone to be knocked over which can damage the portable electronic device.

SUMMARY OF THE INVENTION

The inventor has recognized the aforementioned inherent problems and lack in the art and observed that there is a need for a mounting apparatus to support a portable electronic device which solves these recognized problems and deficiencies. The development of the present invention substantially departs from the conventional solutions and in doing so fulfills this need.

In accordance with features and aspects of certain embodiments, a mounting apparatus for a portable electronic device includes a stand assembly and a connector that is mechanically connected and electrically connected to the stand assembly. A first flexible neck is provided having a lower end attached to the connector and an upper end. A second flexible neck is provided having a lower end attached to the connector and an upper end. A mounting platform assembly is affixed to the first flexible neck upper end and electrically connected to the connecter through the first flexible neck and is configured to electrically connect to a portable electronic device. A lamp assembly is affixed to the second flexible neck upper end and electrically connected to the connector through the second flexible neck. A device holder assembly is attachable to the mounting platform assembly and is configured to releasably retain the portable electronic device.

In accordance with features and aspects of other embodiments, the device holder assembly includes a generally rectangular holder attachment plate having a front surface and a rear surface. Four (4) elastic straps are provided, wherein each of the straps includes an affixed end affixed to a center area of the holder attachment plate front surface and a free end extending toward a respective corner of the holder attachment plate. Four (4) corner brackets are provided, wherein each of the brackets is a right-angle member affixed to the strap free end and configured to receive a respective corner area of the portable electronic device. A holder fastener surface is disposed on the holder attachment plate rear surface and is configured to removably attach to the mounting platform assembly.

In accordance with features and aspects of other embodiments, the mounting assembly includes a generally rectangular mounting attachment plate having a front surface and rear surface. A front mounting fastener surface is disposed on said mounting attachment plate front surface and is configured to removably attach to the device holder assembly. A connector plate is affixed to the mounting attachment plate rear surface and affixed to the first flexible neck upper end. A transformer is disposed within the connector plate and is electrically connected to the connector and is configured to convert alternating current to direct current. A power jack is disposed on the connector plate and electrically connected to the transformer. The power jack is configured to electrically connect to the portable electronic device through an adapter cable.

In accordance with features and aspects of other embodiments, the connector includes a generally cylindrical body configured for insertable attachment to the stand assembly. A male electrical plug is disposed on a bottom surface of the cylindrical body to electrically connect to the stand assembly. The first flexible neck and the second flexible neck are attached to and extend outwardly from a top surface of the cylindrical body.

Other features of certain embodiments of the present invention also include a privacy curtain having a generally circular curtain panel removably attachable to the mounting attachment plate. A rectangular opening is disposed at a center of the curtain panel to receive the connector plate. A slit extends from an edge of the opening to an outer perimeter edge of the curtain panel to receive the first flexible neck. A curtain fastener surface is disposed around a perimeter of the opening configured to removably attach to a rear mounting fastener surface disposed around a perimeter of the mounting attachment plate rear surface. A plurality of weights is attached adjacent to the outer perimeter edge of the curtain panel. The curtain panel hangs downwardly from the mounting attachment plate and entirely surrounds the device holder assembly.

In accordance with features and aspects of other embodiments, the stand assembly includes a floor base having a top surface and a flat bottom surface configured to contact a floor surface. A column extends upwardly from the floor base top surface. A receiver sleeve is disposed on an upper end of the column opposite the floor base and is configured to receive the connector. A female electrical plug is disposed within the receiver sleeve to electrically connect to the connector. A power cord is electrically connected to the female electrical plug through the floor base and the column and is configured to electrically connect to an external power supply.

In accordance with features and aspects of other embodiments, the stand assembly includes a table base having a top surface and a flat bottom surface configured to contact a tabletop surface. A receiver sleeve disposed on the table base top surface configured to receive the connector. A female electrical plug is disposed within the receiver sleeve to electrically connect to the connector. A power cord is electrically connected to the female electrical plug through the table base and is configured to electrically connect to an external power supply.

In accordance with features and aspects of other embodiments, the stand assembly includes a wall base having a front surface and a flat rear surface configured to contact a wall surface. A receiver sleeve is disposed on the wall base front surface configured to receive the connector. A female electrical plug is disposed within the receiver sleeve to electrically connect to the connector. A power cord is electrically connected to the female electrical plug through the wall base and is configured to electrically connect to an external power supply. A pair of aligned generally "L"-shaped bracket slots extends inwardly from opposing edges of the wall base. A generally "U"-shaped headboard mounting bracket is provided having opposing downwardly bent bracket tips configured to engage an upper edge of a headboard. The bracket slots are configured to receive the mounting bracket to suspend the stand assembly from the mounting bracket.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 3a is a close-up view of a device holder assembly of the mounting apparatus for a portable electronic device according to the present invention;

FIG. 3b is a close-up view of the device holder assembly, depicted with a portable electronic device installed, according to the present invention;

Figure 1:
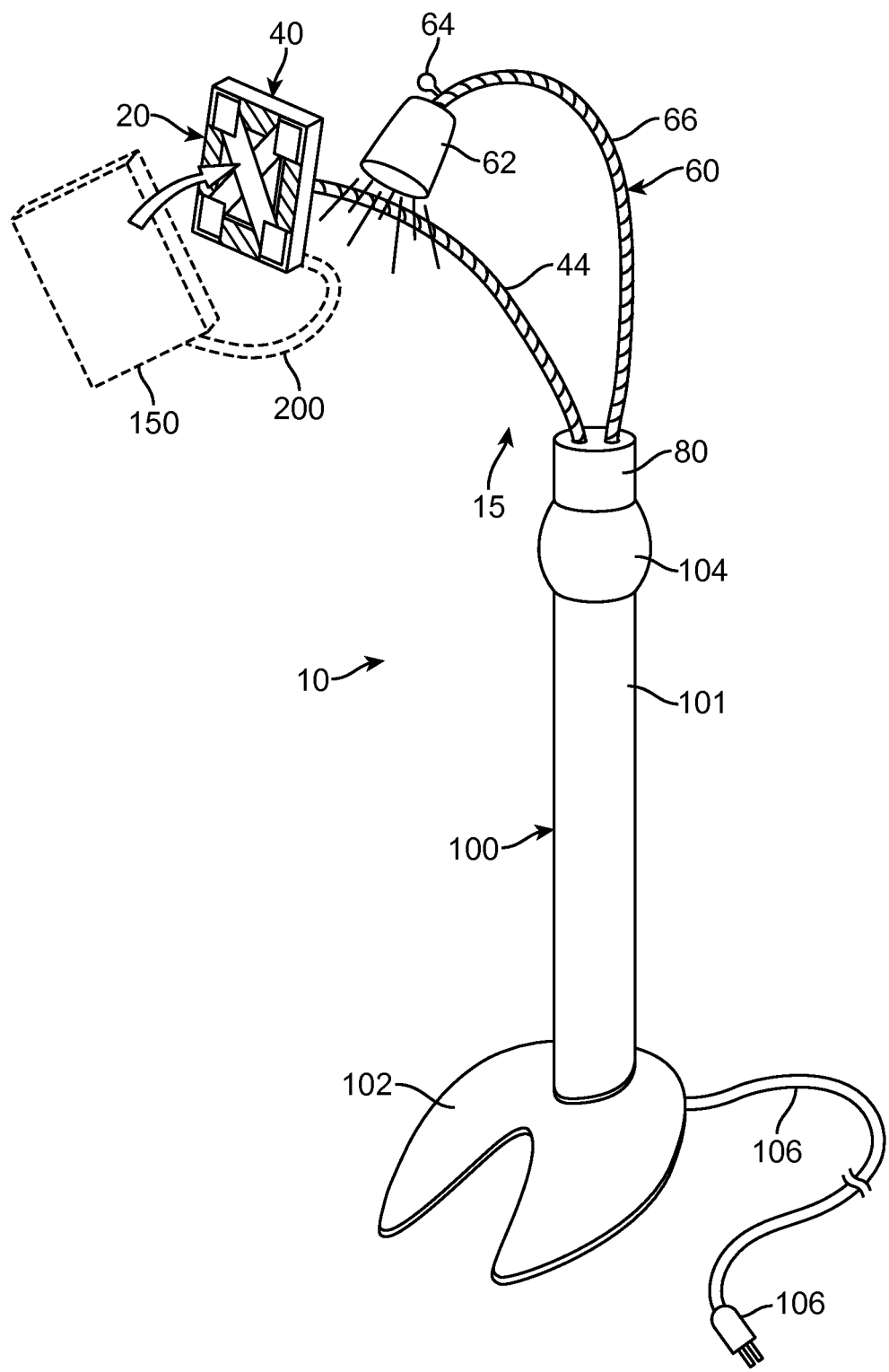
FIG. 1 is a perspective view of a mounting apparatus for a portable electronic device according to the present invention.

DESCRIPTIVE KEY 10 mounting apparatus for a portable electronic device
15 upper assembly
20 device holder assembly
22 corner bracket
24 elastic strap
26 strap attachment area
28 holder attachment plate
30 holder fastener surface
33 input electrical wiring
35 output electrical wiring
40 mounting platform assembly
42 mounting attachment plate
43 front mounting fastener surface
44 first flexible neck
46 connector plate
47 transformer
48 power jack
50 rear mounting fastener surface
60 lamp assembly
62 lamp shade
64 switch
66 second flexible neck
80 connector
82 male plug
90 privacy curtain
92 curtain panel
93 opening
94 curtain fastener surface
96 slit
98 weight
100 floor stand assembly
101 column
102 floor base
104 receiver sleeve
106 power cord
108 female plug
110 top opening
120 table mount
121 tabletop surface
122 table base
124 clamp
126 fastener aperture
128 pad
130 wall mount
131 wall surface
132 wall base
134 mounting aperture
140 headboard mounting bracket
142 bracket tip
144 bracket slot
150 electronic device 200 adapter cable
202 fastener

DETAILED DESCRIPTION OF THE PREFERRED EMBODIMENT

In accordance with the invention, the best mode is presented in terms of certain embodiments, herein depicted within FIGS. 1 through 8b. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps or functions without precluding one or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring now to FIGS. 1 through 8b, depicting a mounting apparatus for a portable electronic device, identified generally by reference to an apparatus 10, where like reference numerals represent similar or like parts. Throughout this disclosure, the apparatus 10 may also be referred to a holder or mounting apparatus. Alternate references of the apparatus 10 in this disclosure are not meant to be limiting in any way. In accordance with the teachings of the present disclosure, the apparatus 10 provides an adjustable mounting surface to position and support various portable electronic devices 150, such as mobile telephones, smart phones, media pads, tablet computers, electronic book readers, and the like, in a "hands-free" manner upon a floor, tabletop, desktop, or wall surface.

Figure 2:
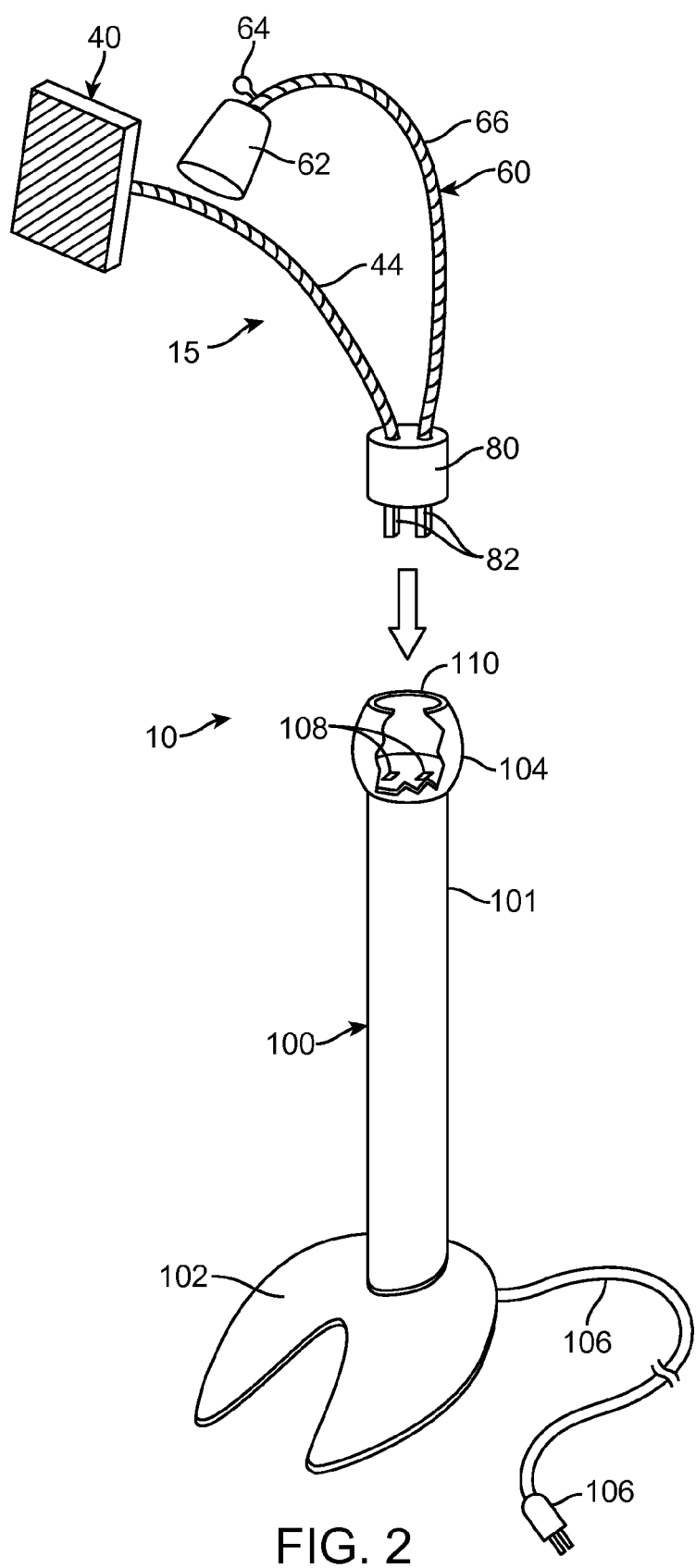
FIG. 2 is an exploded view of the mounting apparatus for a portable electronic device.

Referring first to FIGS. 1 and 2 which depict environmental and exploded views of the apparatus 10. The apparatus 10 is intended to provide convenient viewing of a portable electronic device 150 and generally includes a floor stand assembly 100 and an upper assembly removably attachable to the floor stand assembly 100. The upper assembly 15 includes a connector 80, a mounting platform assembly 40 attached to the connector 80, and a lamp assembly 60 also attached to the connector 80.

Both the mounting platform assembly 40 and the lamp assembly 60 are electrically connected to the connector 80 through a respective first flexible neck 44 and second flexible neck 66. The mounting platform assembly 40 and the lamp assembly 60 are attached to an upper end of the respective first flexible neck 44 and second flexible neck 66. Bottom ends of the first flexible neck 44 and the second flexible neck 66 are mechanically attached to the connector 80. The flexible necks 44, 66 are generally flexible "gooseneck-type" appendages, preferably formed by segmented metal sections, which allow a user to independently position the mounting platform assembly 40 and the lamp assembly 60 at various positions and angles with respect to the floor stand assembly 100.

The connector 80 is removable from the floor stand assembly 100. The connector 80 includes a pronged male plug 82 that is mechanical connected and electrically connected a female plug 108 disposed at an upper end of the floor stand assembly 100. The floor stand assembly 100 also includes a decorative receiver sleeve 104 integrally molded to the upper end to receive and enclose the connector 80 when attached to the floor stand assembly 100. The receiver sleeve 104 can be a spherical or cylindrical shaped structure having a circular top opening 110 for the snug insertion of the cylindrically-shaped connector 80 to provide a secure mechanical and electrical attachment. Output wiring 35 from the connector 80 is routed through a hollow interior of each of the flexible necks 44, 66 to the platform assembly 40 and lamp assembly 60.

The floor stand assembly 100 is generally a unitary structure, preferably formed of plastic or metal, having a vertical column 101 which extends vertically upward from a floor base 102. The column 101 can have a circular, square, rectangular, or triangular cross-sectional shape depending upon final design and desired appearance. The floor base 102 is a generally flat member extending horizontally outward from a lower end of the column 101 for contact with a floor surface. The floor base 102 has a sufficiently large surface area to provide a wide stable base to support the column 101 and connected upper assembly 15 and to resist tipping. In certain embodiments, the floor base 102 can have a decorative shape, such as a circle, oval, or contoured perimeter as illustrated in the figures. The floor stand assembly 100 also includes a power cord 106 electrically connected to the female plug 108 and routed down through a hollow interior of the column 101, through the floor base 102, and terminating at a pronged electrical plug for connection to a household electrical outlet.

Referring next to FIGS. 3a through 5, which depict various views of the mounting platform assembly 40 and the attachable device holding assembly 20. The mounting platform assembly 40 is a generally rectangular structure configured to removably attach the device holder assembly 20, which in turn is configured to removably attach a selected portable electronic device 150. The portable electronic device 150 and adapter cable 200 are shown in broken lines in FIGS. 1, 3b, 4, and 5. The lamp assembly 60 provides a supplemental light source and includes an attached light-directing lamp shade 62 and a two-position power switch 64.

As best seen in FIGS. 3a and 3b, the device holder assembly 20 includes a holder attachment plate 28, four (4) elastic straps 24 affixed to the holder attachment plate 28 by a strap attachment area 26, and four (4) corner brackets 22, with one (1) corner bracket 22 affixed to a free end of each strap 24 opposite the strap attachment area 26. The corner brackets 22 are small right-angle structures, each having an inward-facing open corner suitably sized to receive and captivate a respective corner of the selected portable electronic device 150 within. The rear surface of each corner bracket 22 is adhesively or otherwise permanently affixed to the distal free end of a respective elastic strap 24. The proximal affixed ends of the elastic straps 24 are joined and adhesively or otherwise affixed to the holder attachment plate 28 at a front center position at the strap attachment area 26.

The elastic straps 24 extend outwardly at right angles relative to each other allowing the corresponding corner brackets 22 to be connected over respective corners of the selected electronic device 150. Once securely connected to the corners of the electronic device 150, the elastic straps 24 provide an inward tension force biasing the corner brackets 22 to the center in order to clamp and hold the electronic device 150 against the holder attachment plate 28. It can be appreciated that the holder attachment plate 28 and brackets 22 can be provided in a variety of scaled sizes and the straps 24 can be provided in various widths and lengths which correspond to particular sizes and styles of electronic devices 150, ranging from smart phones to tablet computers, and as such is not meant to be limiting in any way.

Figure 4:
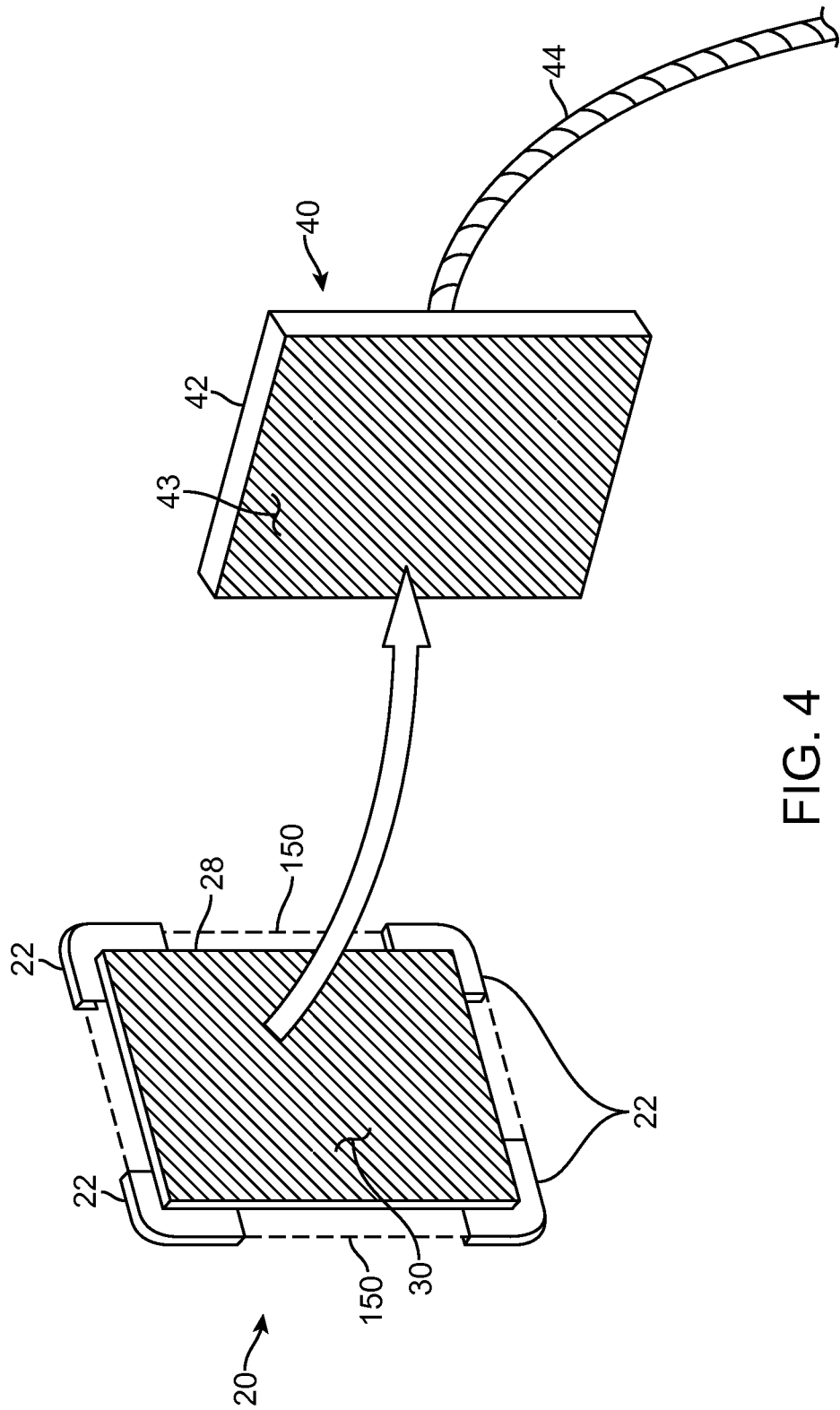
FIG. 4 is an exploded view of the mounting apparatus for a portable electronic device, depicting a mounting platform assembly and the device holder assembly, according to the present invention.
Figure 5:
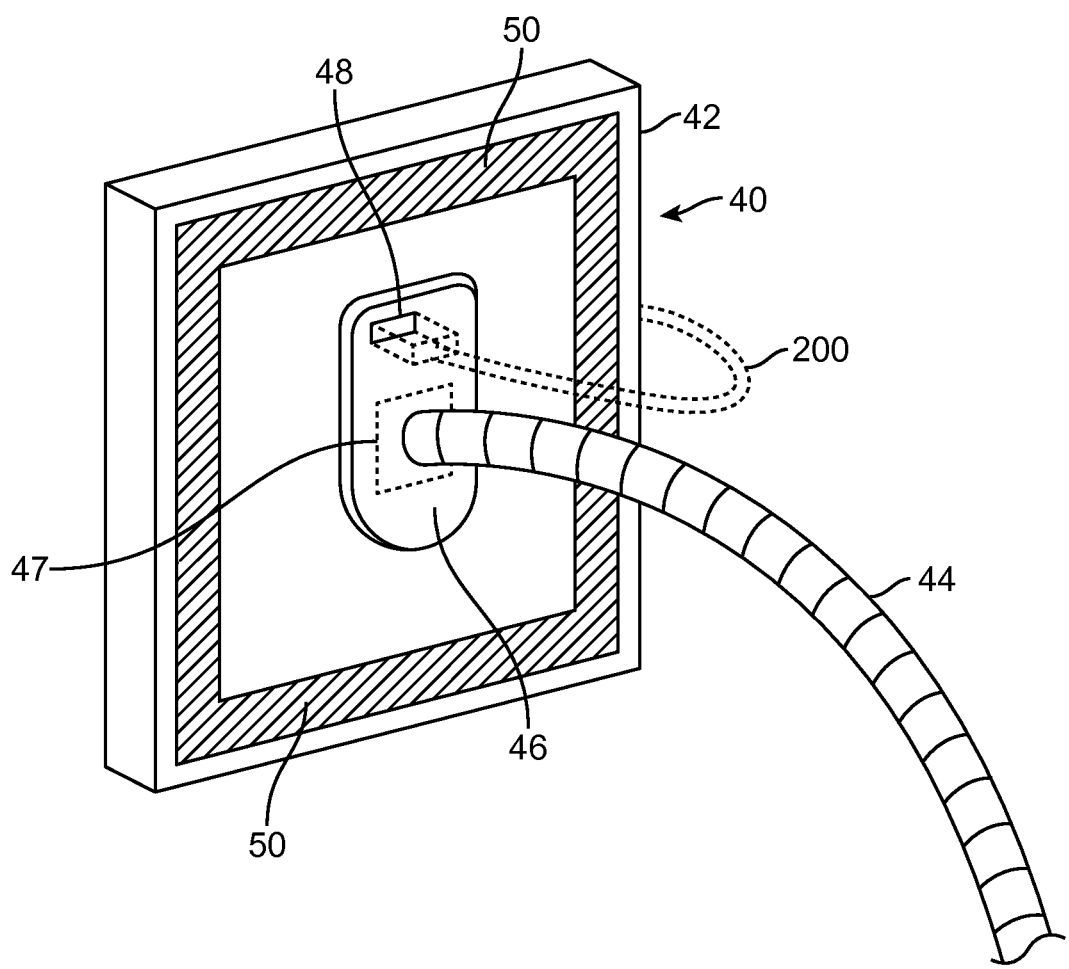
FIG. 5 is a rear view of the mounting platform assembly according to the present invention.

As best seen in FIGS. 4 and 5, the mounting platform assembly 40 includes a rectangular mounting attachment plate 42, preferably made of plastic or light weight metal, having a rear surface permanently attached at a generally perpendicular orientation to the first flexible neck 44 by a connector plate 46. The device holder assembly 20 is removably attachable to a front surface of the mounting attachment plate 42. A rear surface of the holder attachment plate 28 is covered with a holder fastener surface 30 which contactingly engages a corresponding front mounting fastener surface 43 covering the front surface of the mounting attachment plate 42. The mounting platform assembly 40 also includes a rear mounting fastener surface 50 that extends around a perimeter edge of the rear surface for removable attachment of the privacy curtain 90. The fastener surfaces 30, 43, 50 are preferably hook-and-loop fasteners.

The integrally-molded connector plate 46 is preferably located at a central position upon the rear surface of the mounting attachment plate 42. The connector plate 46 includes an internal AC to DC transformer 47 and an externally accessible power jack 48. Output wiring 35 is routed from the connector through the hollow first flexible neck 44 to the transformer 47. The power jack 48 is electrically connected to the transformer 47. The transformer 47 converts a supplied 110-volt power into a voltage suitable to power or charge the electronic device 150. The electronic device 150 is electrically connected to power jack 48 using an adapter cable 200, envisioned to be supplied with the electronic device 150. The power jack 48 is preferably a Universal Serial Bus connector (USB); however, it can be appreciated that equivalent powering and charging connectors and cables can be utilized with equal benefit and is not meant to be limiting in any way.

Figure 6A:
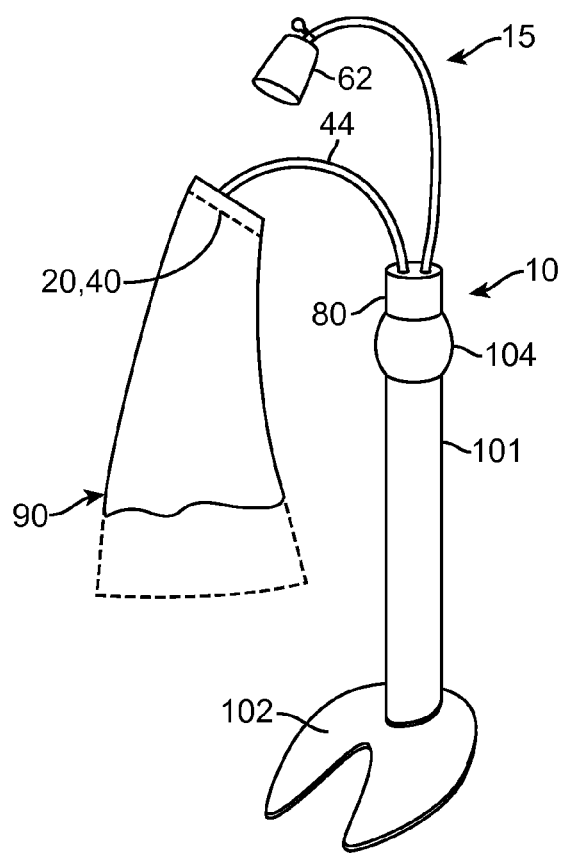
FIG. 6a is a perspective view of the mounting apparatus for a portable electronic device, depicted with an attached privacy curtain an in-use state, according to the present invention.
Figure 6B:
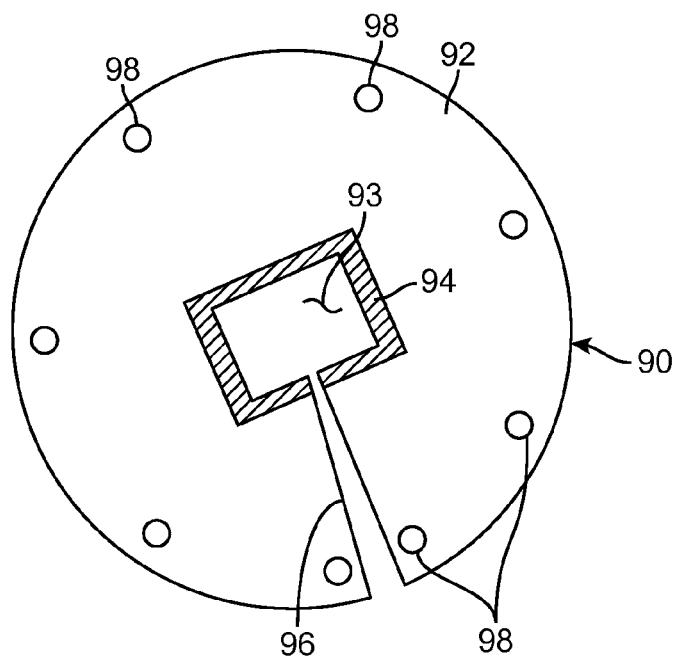
FIG. 6b is an upwardly looking plan view of the privacy curtain, depicted detached from the mounting platform assembly, according to the present invention.

Referring next to FIGS. 6a and 6b, the privacy curtain 90 extends down over the device holding assembly 20 and attached portable electronic device 150 to provide a user the ability to view the electronic device 150 without disturbing other persons nearby. The privacy curtain 90 is a circular or ovular fabric curtain panel 92 having a central rectangular opening 93, a curtain fastener surface 94, a slit 96, and a plurality of weights 98. The curtain fastener surface 94 is disposed along a perimeter edge of the center opening 93 for removable attachment to the rear mounting fastener surface 50 of the mounting attachment plate 42. The curtain fastener surface 94 is also preferably a hook-and-loop fastener. The slit 96 extends from an edge of the opening 93 to a perimeter edge of the curtain panel 92 and enables installation of the privacy curtain 90 around the first flexible neck 44. The weights 98 are preferably small, round metallic members affixed to the privacy curtain 90 adjacent to the perimeter edge of the curtain panel 92. The weights 98 are preferably attached to the curtain panel 92 by adhesive-backed hook-and-loop fasteners or equivalent attachment means. The weights 98 bias the privacy curtain 90 to hang vertically downward over the device holding assembly 20 and attached portable electronic device 150 forming a cylindrical enclosure around the user for private viewing of the electronic device 150 and to avoid disturbing other persons nearby. The curtain panel 92 can be cut along a bottom edge to create a desired length before installing the weights 98.

Figure 7:
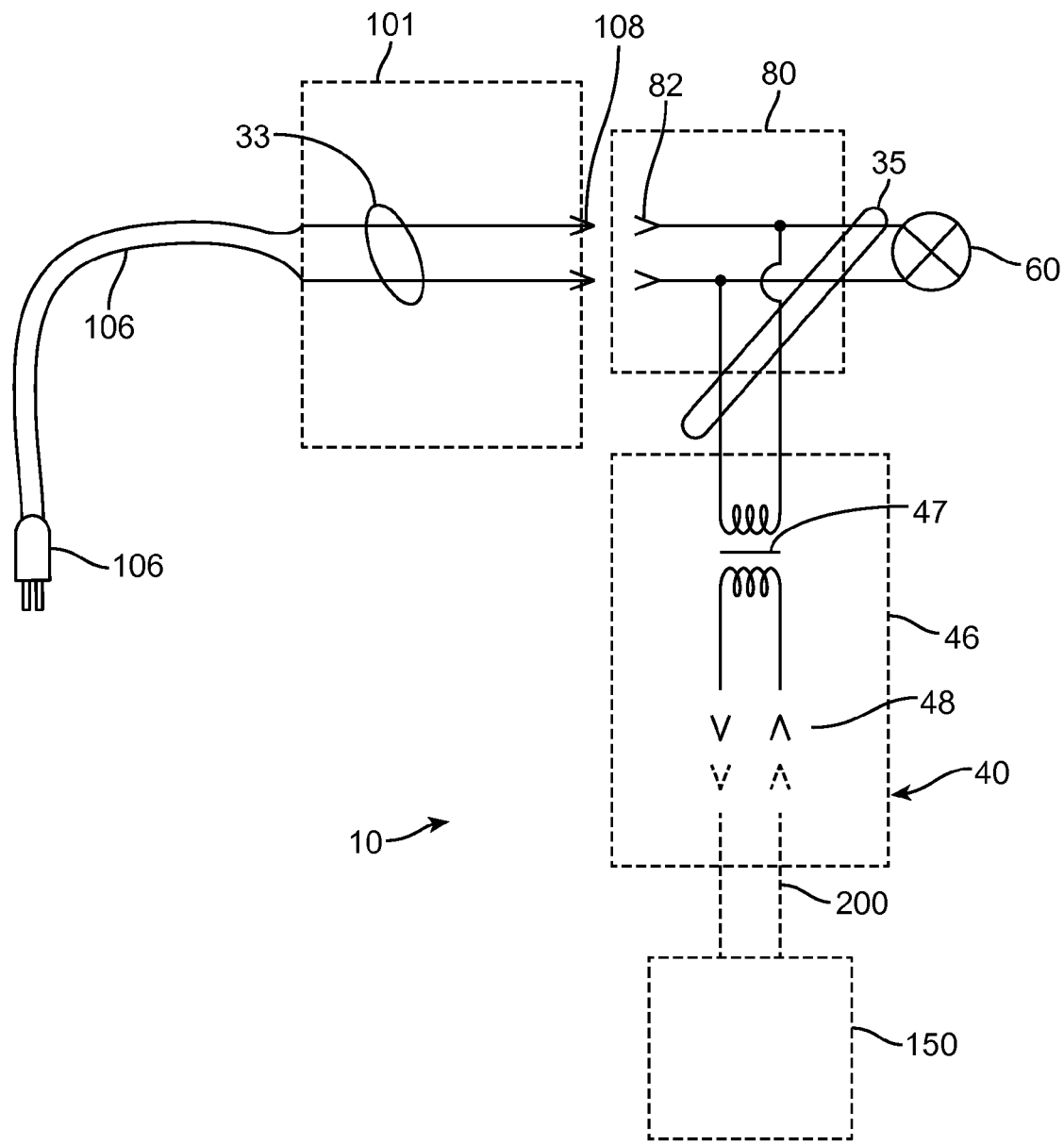
FIG. 7 is an electrical block diagram depicting the major electrical components of the mounting apparatus for a portable electronic device according to the present invention.

Referring now to FIG. 7, depicting a block diagram which illustrates the main electrical components of the apparatus 10. Electrical power for the apparatus 10 is envisioned to be obtained from a household outlet via the power cord 106 which in turn conducts 110-volt AC current through input electrical wiring 33 disposed within the floor base 102 and the column 101 of the floor stand assembly 100. The electrical power is conducted through the receiver sleeve 104 and connector 80 via electrical connection of the respective female plug 108 and male plug 82. The electrical power is split in a parallel manner via output electrical wiring 35 disposed within the connector 80 to supply power to the transformer 47 and power jack 48 of the mounting platform assembly 40 and to the lamp assembly 60 through the first and second flexible necks 44, 66. The power jack 48 is utilized to provide operating or charging power to the electrical device 150 when mechanically connected to the device holder assembly 20 and electrically connected via the adapter cable 200.

Figure 8A:
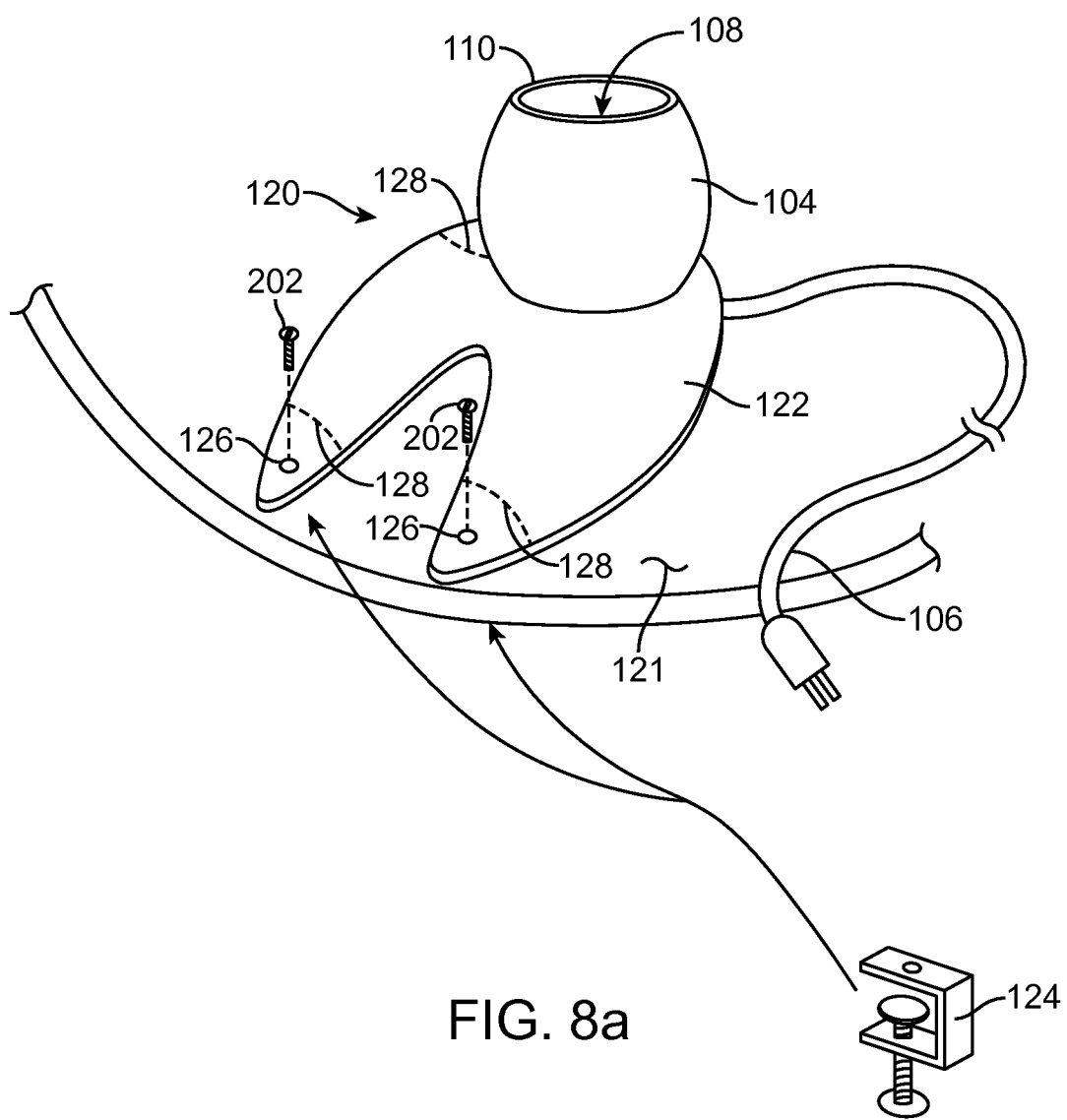
FIG. 8a is a perspective view of a table-mounted embodiment of the mounting apparatus for a portable electronic device according to the present invention; and, FIG. 8b is a perspective view of a wall-mounted embodiment of the mounting apparatus for a portable electronic device according to the present invention.

Referring to FIG. 8a, which depicts an alternate table mount 120. The connector 80, mounting platform assembly 40, and lamp assembly 60 can alternately be mounted to a table or desk surface by utilizing the table mount 120. The table mount 120 is attached to an edge of a tabletop surface 121 using respective fastener apertures 126 and a pair of threaded clamp s 124. The table mount 120 is mechanically and electrically attached to the connector 80 by utilizing a receiver sleeve 104 in a similar manner as described in the floor stand assembly 100. The table mount 120 includes a table base 122 having a reduced overall size yet and the integral receiver sleeve 104 forming a low-profile unitary structure. A plurality of felt or rubber pads 128 are arranged along and adhesively bonded to a bottom surface of the table base 122 to provide protection to the tabletop surface 121. The table base 122 provides a similar stabilizing function as the floor base 102. At least two (2) fastener apertures 126 are disposed along edges of the table base 122 which work in conjunction with and receive a threaded fastener 202 of each respective clamp 124. The edge clamps 124 are positioned underneath a bottom surface of the table base 122 aligned with the fastener apertures 126 and fastened by insertion of the fasteners 202. The upper portion of the clamps 124 are positioned discreetly below the table base 122. A lower portion of the clamps 124 are positioned under the tabletop surface 121. The clamp 124 preferably includes a threaded thumbscrew or similar tightening feature to secure the table mount 120 to the edge of the tabletop surface 121. The table mount 120 includes similar electrical components and connection as described above and includes a similar female plug 108 and power cord 106.

Figure 8B:
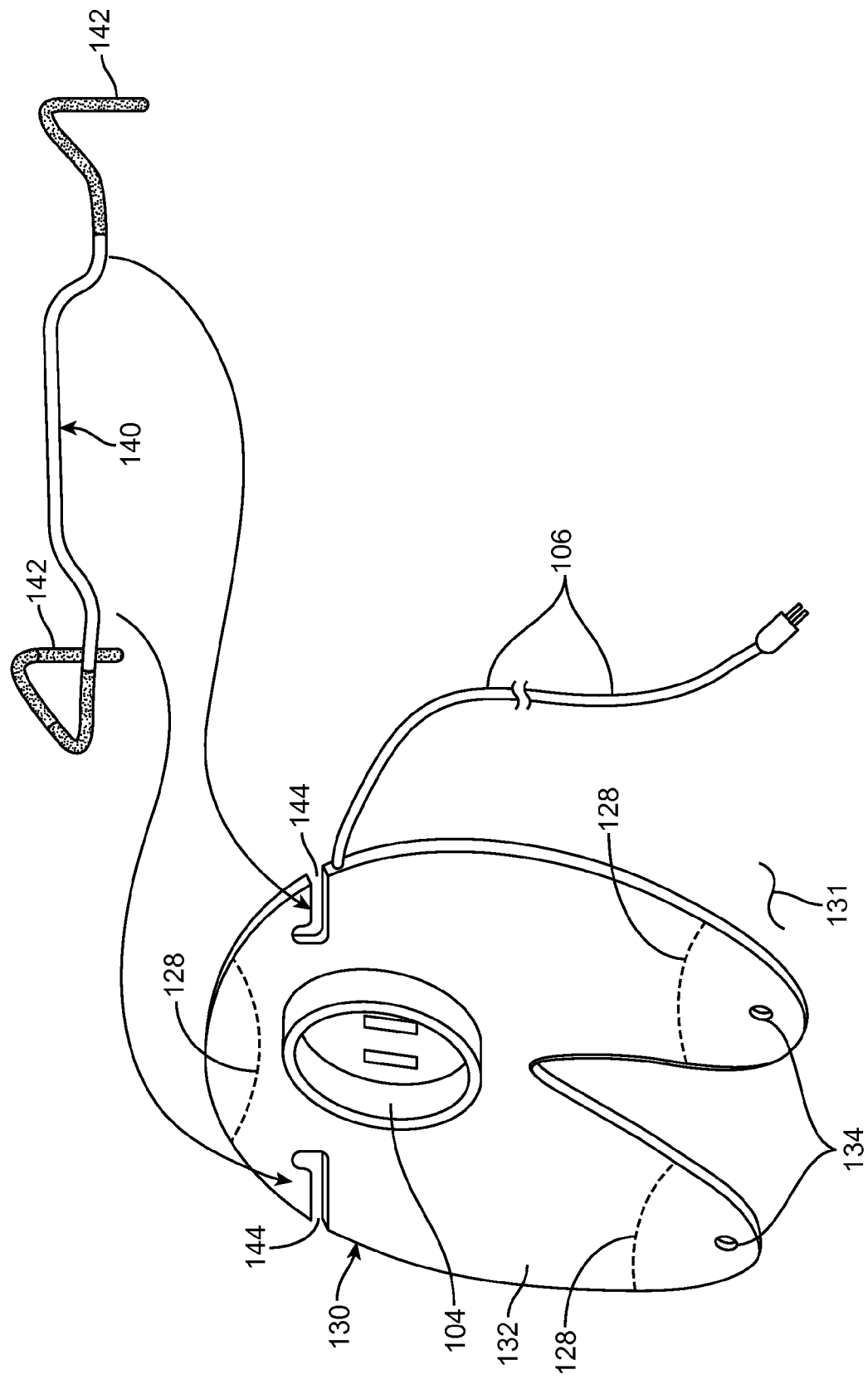

Referring to FIG. 8b, which depicts an alternate wall mount 130. The wall mount 130 is mechanically and electrically attached to the connector 80 by utilizing a receiver sleeve 104 in a similar manner as described in the floor stand assembly 100 and table mount 120. The wall mount 130 includes a wall base portion 132 having at least two (2) mounting apertures 134 disposed along opposing outer edges to receive various mechanical fasteners to secure the wall mount 130 to a wall surface 131. The wall base 132 includes an integrally molded pair of "L"-shaped bracket slots 144 for attachment to a headboard of a bed by a headboard mounting bracket 140. The headboard mounting bracket 140 is a generally "U"-shaped rod structure having rubber coated and downturned bracket tip 142 at each end designed to hook over an upper profile of the headboard. The headboard mounting bracket 140 insertingly engages the bracket slots 144 to support and suspend the wall mount 130. The wall base 132 can also include a plurality of pads 128 bonded to a bottom surface to provide protection to wall and headboard surfaces.

It can be appreciated by one skilled in the art that other styles and configurations of the present invention can be easily incorporated into the teachings of the present disclosure and only certain particular configurations have been shown and described for purposes of clarity and disclosure and not by way of limitation of scope.

In accordance with the principles of the present invention, the apparatus 10 can be installed and utilized by the user in a simple and effortless manner with little or no training in general accordance with FIG. 1 through FIG. 8b. It can be appreciated that the steps required to utilize the apparatus 10, as described, can performed in alternative order and as such should not be viewed as a limiting factor.

The method of installing and utilizing the upper assembly 15 with the floor stand assembly 100 can be achieved by: procuring a model of the apparatus 10 having at least one (1) device holder assembly 20 particularly sized to encompass and hold respective existing electronic devices 150; attaching the electronic device 150 to the device holder assembly 20 by extending the four (4) elastic straps 24 outwardly; engaging corners of the electronic device 150 within respective corner brackets 22; attaching the device holder assembly 20 to the mounting platform assembly 40 by pressing the holder fastener surface 30 and the front mounting fastener surface 43 together; inserting the connector 80 into the top opening 110 of the receiver sleeve 104 until obtaining full engagement of respective male plug 82 and female plug 108, if not previously assembled; connecting a provided adapter cable 200 between the power jack 48 and the electronic device 150, if desired to power or charge the electronic device 150; plugging the power cord 106 into an available household outlet; illuminating the lamp assembly 60 by utilizing the switch 64, as needed; and, benefiting from viewing of electronic devices in a "hands-free" manner.

The method of installing the privacy curtain 90 of the apparatus 10 as seen in FIG. 6a can be achieved by: inserting the slit 96 of the privacy curtain 90 around the first flexible neck 44; aligning and fastening the rear mounting fastener surface 50 of the mounting platform assembly 40 to the curtain fastener surface 94 of the privacy curtain 90; trimming a bottom edge of the privacy curtain 90 to a particular length using scissors, as desired; installing the weights 98 along a bottom edge of the privacy curtain 90 using adhesive-backed hook-and-loop fasteners or equivalent attachment; and, benefiting from private viewing of an electronic device 150.

The method of installing and utilizing the upper assembly 15 with the table mount 120 as seen in FIG. 8a can be achieved by: detaching the floor stand assembly 100 from the connector 80, if previously installed; inserting the connector 80 into the receiver sleeve 104 until obtaining full engagement of respective male plug 82 and female plug 108; utilizing the clamps 124 to secure the table base 122 to the tabletop surface 121; plugging the power cord 106 into an available household outlet; and, utilizing the device holder assembly 20, mounting platform assembly 40, and lamp assembly 60 as previously described.

The method of installing and utilizing the upper assembly 15 with the wall mount 130 can be achieved by: securing the wall base 132 of the wall mount 130 to a wall surface 131 by driving fasteners through the mounting apertures 134 and into the wall surface 131; inserting the connector 80 into the receiver sleeve 104 until obtaining full engagement of respective male plug 82 and female plug 108; plugging the power cord 106 into an available household outlet; and, utilizing the device holder assembly 20, mounting platform assembly 40, and lamp assembly 60 as previously described. The wall mount 130 can also be mounted to a headboard of a bed by engaging the headboard mounting bracket 140 with the bracket slots 144 of the wall base 132 and extending the rubber coated and downturned bracket tips 142 over the headboard.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A mounting apparatus for a portable electronic device, said apparatus comprising:

a stand assembly comprising a receiver sleeve;

a connector mechanically connected within said receiver sleeve and electrically connected to said stand assembly;

a first flexible neck comprising a lower end attached to said connector and an upper end;

a second flexible neck comprising a lower end attached to said connector and an upper end;

a mounting platform assembly affixed to said upper end of said first flexible neck and electrically connected to said connecter through said first flexible neck, said mounting platform assembly comprising:

a mounting attachment plate having a front surface and rear surface;

a front mounting fastener disposed on said front surface of said mounting attachment plate; and, a rear mounting fastener disposed on said rear surface of said mounting attachment plate;

a lamp assembly affixed to said upper end of said second flexible neck and electrically connected to said connector through said second flexible neck;

a device holder assembly attachable to said mounting platform assembly, said device holder assembly comprising:

a holder attachment plate having a front surface and a rear surface;

four elastic straps, each strap comprising an affixed end affixed to a center area of said front surface of said holder attachment plate and a free end extending toward a respective corner of said holder attachment plate;

four corner brackets, each bracket comprises a right-angle member affixed to said free end of said each strap, said right-angle member comprising an inward-facing open corner suitably sized to receive and captivate a respective corner said portable electronic device; and,
a holder fastener disposed on said rear surface of said holder attachment plate; and,
a privacy curtain, further comprising:
a generally circular curtain panel;
a rectangular opening disposed at a center of said curtain panel;
a slit extending from a perimeter edge of said opening to an outer perimeter edge of said curtain panel for receiving said first flexible neck;
a curtain fastener disposed around said perimeter edge of said opening; and,
a plurality of weights attached adjacent to said outer perimeter edge of said curtain panel;
wherein said curtain fastener is removably attachable to said rear mounting fastener for attaching said curtain panel to said mounting attachment plate; and,
wherein said privacy curtain hangs downwardly from said mounting platform assembly and entirely surrounds said device holder assembly;
wherein said four corner brackets matingly engage four corners of said portable electronic device for attaching said portable electronic device to said holder attachment plate; and,
wherein said holder fastener removably attaches to said front mounting fastener for attaching said holder attachment plate to said mounting attachment plate.

2. The apparatus of claim 1, wherein said connector comprises:
a generally cylindrical body configured for insertable attachment to said; and,
a male electrical plug disposed on a bottom surface of said cylindrical body to electrically connect to said stand assembly;
wherein said first flexible neck and said second flexible neck are attached to and extend outwardly from a top surface of said cylindrical body.

3. The apparatus of claim 1, wherein said stand assembly comprises:
a floor base comprising a top surface and a flat bottom surface configured to contact a floor surface;
a column extending upwardly from said floor base top surface, said receiver sleeve being disposed on an upper end of said column opposite said floor base;
a female electrical plug disposed within said receiver sleeve to electrically connect to said connector; and,
a power cord electrically connected to said female electrical plug through said floor base and said column and configured to electrically connect to an external power supply.

4. The apparatus of claim 1, wherein said mounting assembly comprises:
a connector plate affixed to said rear surface of said mounting attachment plate and affixed to said upper end of said first flexible neck;
an AC to DC transformer configured to convert alternating current to direct current, said AC to DC transformer being disposed within said connector plate and electrically connected to said connector; and,
a power jack disposed on said connector plate and electrically connected to said AC to DC transformer;
wherein said power jack is configured to be electrically connected to said portable electronic device through an adapter cable.

5. The apparatus of claim 1, wherein said stand assembly comprises:
a table base comprising a top surface and a flat bottom surface configured to contact a tabletop surface, said receiver sleeve being disposed on said top surface of said table base;
a female electrical plug disposed within said receiver sleeve to electrically connect to said connector; and,
a power cord electrically connected to said female electrical plug through said table base and configured to electrically connect to an external power supply.

6. The apparatus of claim 5, wherein said stand assembly further comprises:
a pair of fastener apertures disposed through said table base; and,
a pair of generally C-shaped clamps, each of said clamps comprising an upper portion attached to said table base bottom surface by fasteners inserted through said fastener aperture, a lower portion configured to be positioned under said tabletop surface, and a thumbscrew threadingly attached to said clamp lower portion configured to be adjustably tightened to contact an underside of said tabletop surface.

7. The apparatus of claim 1, wherein said stand assembly comprises:
a wall base comprising a front surface and a flat rear surface configured to contact a wall surface, said receiver sleeve being disposed on said front surface of said wall base;
a female electrical plug disposed within said receiver sleeve to electrically connect to said connector; and,
a power cord electrically connected to said female electrical plug through said wall base and configured to electrically connect to an external power supply.

8. The apparatus of claim 7, wherein said stand assembly further comprises:
a pair of aligned generally "L"-shaped bracket slots extending inwardly from opposing edges of said wall base; and,
a generally "U"-shaped headboard mounting bracket comprising opposing downwardly bent bracket tips configured to engage an upper edge of a headboard;
wherein said bracket slots are configured to receive said mounting bracket to suspend said stand assembly from said mounting bracket.

9. The apparatus of claim 1, wherein said lamp assembly comprises:
a light socket attached to said second flexible neck upper end and electrically connected to said connector, said light socket configured to receive a light bulb;
a switch electrically connected between said connector and said light socket to actuate power to said light socket; and,
a lamp shade affixed to said second flexible neck upper end around said light socket.

10. A mounting apparatus for a portable electronic device, said apparatus comprising:
a base;
a generally cylindrical receiver sleeve disposed on said base;
a female electrical plug disposed within said receiver sleeve;
a power cord electrically connected to said female electrical plug and configured to electrically connect to an external power supply;

a generally cylindrical connector configured for insertable attachment within said receiver sleeve;

a male electrical plug disposed on a bottom surface of said connector to electrically connect to said female electrical plug;

a first flexible neck comprising a lower end attached to a top surface of said connector and an upper end;

a second flexible neck comprising a lower end attached to said top surface of said connector and an upper end;

a mounting attachment plate attached to said upper end of said first flexible neck and electrically connected to said male electrical plug through said first flexible neck, said mounting attachment plate comprising a front surface and rear surface;

a front mounting fastener disposed on said front surface of said mounting attachment plate;

a rear mounting fastener disposed on said rear surface of said mounting attachment plate;

a light socket attached to said upper end of said second flexible neck and electrically connected to said male electrical plug through said second flexible neck, said light socket being configured to receive a light bulb;

a switch electrically connected between said male electrical plug and said light socket to actuate power to said light socket;

a lamp shade attached to said upper end of said second flexible neck around said light socket;

a holder attachment plate having a front surface and a rear surface;

four elastic straps, each strap comprising an affixed end affixed to a center area of said front surface of said holder attachment plate and a free end extending toward a respective corner of said holder attachment plate;

four corner brackets, each bracket comprises a right-angle member affixed to said free end of said each strap, said right-angle member comprising an inward-facing open corner suitably sized to receive and captivate a respective corner said portable electronic device;

a holder fastener disposed on said rear surface of said holder attachment plate;

a generally circular curtain panel comprising a rectangular opening disposed at a center of said curtain panel and a slit extending from a perimeter edge of said opening to an outer perimeter edge of said curtain panel;

a curtain fastener disposed around said perimeter edge of said opening;

a plurality of weights attached adjacent to said outer perimeter edge of said curtain panel;

wherein said four corner brackets matingly engage four corners of said portable electronic device for attaching said portable electronic device to said holder attachment plate;

wherein said holder fastener removably attaches to said front mounting fastener for attaching said holder attachment plate to said mounting attachment plate; and, wherein said curtain fastener removably attaches to said rear mounting fastener for attaching said curtain panel to said mounting attachment plate and hanging downwardly from said mounting attachment plate for entirely surrounding said holder attachment plate and said portable electronic device.

11. The apparatus of claim 10, wherein said mounting assembly further comprises:

a connector plate affixed to said rear surface of said mounting attachment plate and affixed to said upper end of said first flexible neck;

an AC to DC transformer configured to convert alternating current to direct current, said AC to DC transformer being disposed within said connector plate and electrically connected to said male electrical plug; and, a power jack disposed on said connector plate and electrically connected to said AC to DC transformer;

wherein said power jack is configured to be electrically connect to said portable electronic device through an adapter cable.

12. The apparatus of claim 10, wherein said base comprises:

a floor base comprising a top surface and a flat bottom surface configured to contact a floor surface; and, a column extending upwardly from said floor base top surface;

wherein said receiver sleeve is disposed on an upper end of said column opposite said floor base; and, wherein said power cord is electrically connected to said female electrical plug through said floor base and said column.

13. The apparatus of claim 10, wherein said base comprises:

a table base comprising a top surface and a flat bottom surface configured to contact a tabletop surface;

a pair of fastener apertures disposed through said table base; and, a pair of generally "C"-shaped clamps, each of said clamps comprising an upper portion attached to said table base bottom surface by fasteners inserted through said fastener aperture, a lower portion configured to be positioned under said tabletop surface, and a thumbscrew threadingly attached to said clamp lower portion configured to be adjustably tightened to contact an underside of said tabletop surface;

wherein said receiver sleeve is disposed on said table base top surface; and, wherein said power cord is electrically connected to said female electrical plug through said table base.

14. The apparatus of claim 10, wherein said base comprises:

a wall base comprising a front surface and a flat rear surface configured to contact a wall surface; and, a pair of fastener apertures disposed through said wall base;

wherein said receiver sleeve is disposed on said wall base front surface; and, wherein said power cord is electrically connected to said female electrical plug through said wall base.

15. The apparatus of claim 14, wherein said base further comprises:

a pair of aligned generally "L"-shaped bracket slots extending inwardly from opposing edges of said wall base; and, a generally "U"-shaped headboard mounting bracket comprising opposing downwardly bent bracket tips configured to engage an upper edge of a headboard;

wherein said bracket slots are configured to receive said mounting bracket to suspend said stand assembly from said mounting bracket.

* * * * *